(12) United States Patent
Kobayashi

(10) Patent No.: US 8,910,038 B2
(45) Date of Patent: Dec. 9, 2014

(54) APPARATUS AND METHOD FOR IMAGE SEPARATION, LAYOUT, AND TEMPLATING

(75) Inventor: Yuji Kobayashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 625 days.

(21) Appl. No.: 12/414,049

(22) Filed: Mar. 30, 2009

(65) Prior Publication Data

US 2009/0254813 A1 Oct. 8, 2009

(30) Foreign Application Priority Data

Apr. 4, 2008 (JP) ................... 2008-098747
Sep. 30, 2008 (JP) ................... 2008-255256

(51) Int. Cl.
*G06F 17/00* (2006.01)
*H04N 1/387* (2006.01)
*G06T 11/60* (2006.01)
*G06F 17/24* (2006.01)
*H04N 1/32* (2006.01)

(52) U.S. Cl.
CPC .............. *H04N 1/387* (2013.01); *G06F 17/248* (2013.01); *G06T 11/60* (2013.01); *H04N 1/32101* (2013.01); *H04N 2201/3242* (2013.01); *H04N 2201/3245* (2013.01); *H04N 2201/3274* (2013.01)
USPC ............................ 715/246; 715/200; 715/243

(58) Field of Classification Search
CPC .............................. G06F 17/248; G06F 17/212
USPC ........................................... 715/243, 246, 200
See application file for complete search history.

(56) References Cited

U.S. PATENT DOCUMENTS

| 5,452,094 A | 9/1995 | Ebner et al. | |
| 6,456,738 B1 * | 9/2002 | Tsukasa | 715/251 |
| 7,191,398 B2 | 3/2007 | Nitta et al. | |
| 2002/0165937 A1 | 11/2002 | Nitta et al. | |
| 2005/0271281 A1 * | 12/2005 | Simard et al. | 382/225 |
| 2006/0088214 A1 * | 4/2006 | Handley et al. | 382/176 |
| 2006/0230341 A1 | 10/2006 | Yamamoto | |
| 2006/0271424 A1 | 11/2006 | Gava et al. | |
| 2007/0024908 A1 * | 2/2007 | Hanechak | 358/1.18 |
| 2007/0208996 A1 * | 9/2007 | Berkner et al. | 715/521 |
| 2008/0215967 A1 * | 9/2008 | Abrams et al. | 715/255 |
| 2010/0115404 A1 * | 5/2010 | Sun et al. | 715/268 |

FOREIGN PATENT DOCUMENTS

| JP | 6-164894 | 6/1994 |
| JP | 2000-293671 | 10/2000 |
| JP | 2002-297570 A | 10/2002 |
| JP | 2005-092865 A | 4/2005 |

(Continued)

OTHER PUBLICATIONS

No Author, ScanSoft OmniPage 15 User's Guide, 2005, ScanSoft Inc. Retrieved from ftp://ftp.scansoft.com/files/support/manuals/op15guide.pdf.*

(Continued)

*Primary Examiner* — Chau Nguyen
(74) *Attorney, Agent, or Firm* — Fitzpatrick, Cella, Harper & Scinto

(57) ABSTRACT

A document processing apparatus accepts input of image information which represents a document, separates the image information as content of the document into regions, associates the image information separated as content into regions with information used to lay out the content, and holds the associated information as learning information. Subsequently, the document processing apparatus lays out the content of the inputted document based on the held learning information and outputs a document in which the content is laid out.

11 Claims, 18 Drawing Sheets

(56) References Cited

FOREIGN PATENT DOCUMENTS

| | | |
|---|---|---|
| JP | 2006-238289 A | 9/2006 |
| JP | 2006-262442 A | 9/2006 |
| JP | 2006-331427 | 12/2006 |

OTHER PUBLICATIONS

Flynn et al. "Automated Template-Based Metadata Extraction Architecture", 2007, D.H.-L. Goh et al. (Eds.): ICADL 2007, LNCS 4822, pp. 327-336, 2007, © Springer-Verlag Berlin Heidelberg 2007.*

* cited by examiner

FIG. 5

| 501 | 502 | 503 | 504 | 505 | 506 | 507 | 508 | 509 | 510 | 511 | 512 | 513 | 514 | 515 | 516 | 517 |
|---|---|---|---|---|---|---|---|---|---|---|---|---|---|---|---|---|
| ID | path | (H,W) | Grid1 | Grid2 | Grid3 | Grid4 | Grid5 | Grid6 | Grid7 | Grid8 | Grid9 | BG | Portrait | Square | Landscape | Others |
| 1 | | | | | | | | | | | | | | | | |
| 2 | | | | | | | | | | | | | | | | |
| 3 | | | | | | | | | | | | | | | | |
| 4 | | | | | | | | | | | | | | | | |
| 5 | | | | | | | | | | | | | | | | |
| 6 | | | | | | | | | | | | | | | | |
| 7 | | | | | | | | | | | | | | | | |
| 8 | | | | | | | | | | | | | | | | |
| 9 | | | | | | | | | | | | | | | | |

<bg x="xxx" y="yyy" slotID="123000" type="photo" orientation="portrait" crop="no">
    photo1.jpg
  </bg>
  <slot x="xxx" y="yyy" slotID="123001" type="photo" orientation="none" crop="yes">
    photo2.jpg
  </slot>
  <slot x="xxx" y="yyy" slotID="123002" type="photo" orientation="none" crop="yes">
    photo3.jpg
  </slot>
  <slot x="xxx" y="yyy" slotID="123003" type="text" font="zzz" size="40pt" direction="horizontal" crop="no">
    Sale
  </slot>

```

F I G. 16B

```
<slotRelation>
  <group id="g001" >
    <slots unifiedID="g001000" >
      <slot>123000</slot>
      <slot>154000</slot>
    </slots>
    <slots unifiedID="g001001" >
      <slot>123001</slot>
      <slot>154001</slot>
    </slots>
    <slots unifiedID="g001002" >
      <slot>123002</slot>
      <slot>154002</slot>
    </slots>
    <slots unifiedID="g001003" >
      <slot>123003</slot>
      <slot>154003</slot>
    </slots>
  </group>
</slotRelation>
```

F I G. 17

```
<slotSelection>
<set contentID="1999043022246012" update="2007-02-10T10:00Z">
  <slot>
    <id>g001002</id>
    <freq>34</freq>
  </slot>
  <slot>
    <id>289000</id>
    <freq>5</freq>
  </slot>
</set>
<set contentID="2003042923000011" update="2007-01-28T08:58Z">
  <slot>
    <id>128001</id>
    <freq>23</freq>
  </slot>
</set>
</slotSelection>
```

APPARATUS AND METHOD FOR IMAGE SEPARATION, LAYOUT, AND TEMPLATING

BACKGROUND OF THE INVENTION

1. Field of the Invention

The present invention relates to a document processing apparatus and document processing method.

2. Description of the Related Art

Techniques have been proposed which scale up/down, relocate, and otherwise manipulate an input document image and output a resulting new document. For example, in the field of copiers, a reduced printing technique has been implemented which prints plural page images by scaling them down and arranging them on a single page.

Also, layout editors such as DTP (desktop publishing) applications have been used to help operators lay out document component data on a computer. Such layout editors provide a method for generating a document easily by putting component data into one of layout templates prepared in advance. Furthermore, systems have been proposed in which component data is laid out automatically by a computer program rather than manually by the operator.

Also, a technique has been proposed for copying a scanned document by adding images and the like such as an advertisement and logo provided by a sponsor (see, for example, Japanese Patent Laid-Open No. 2006-331427).

Also, a technique has been proposed which, being provided with a logo printing mode, allows an operator to specify, via a user interface, a range in a scanned original in order for a custom logo image to be laid out and thereby outputs the scanned original by superimposing the logo image thereon (see, for example, Japanese Patent Laid-Open No. 6-164894).

However, with the conventional techniques, the operator needs to explicitly specify where to lay out individual images in composing a page image, which makes it difficult to produce an image output by determining an optimal layout location for each image.

SUMMARY OF THE INVENTION

The present invention provides a document processing apparatus that enable laying out content of an input document automatically.

Moreover, the present invention provides a document processing apparatus that enable outputting a desirable layout of content without the need for an operator to specify layout locations.

According to one aspect of the present invention, there is provided a document processing apparatus comprising: an input unit that inputs image information representing a document; a separation unit that separates the image information as content of the document into regions; a holding unit that associates the image information separated as content into regions with information used to lay out the content and holds the associated information as learning information; and a layout unit that lays out the content of the inputted document based on the held learning information.

According to another aspect of the present invention, there is provided a document processing apparatus comprising: a template selection unit that selects a template which defines layout information of content; a layout unit that generates a document by laying out the content at a layout location indicated by the layout information defined in the template, based on the template selected by the template selection unit and on the content; an editing unit that changes the layout information about the content contained in the document generated by the layout unit, based on a user action; and a storing unit that stores the content, the layout information, and frequency information in a storage device as layout learning data by associating the content, the layout information, and the frequency information with each other when the layout information is changed by the editing unit, where the frequency information represents frequency with which the content has been applied or changed.

According to still another aspect of the present invention, there is provided a document processing method comprising: accepting input of image information which represents a document; separating the image information as content of the document into regions; associating the image information separated as content into regions with information used to lay out the content and holding the associated information as learning information; and laying out the content of the inputted document based on the held learning information.

According to yet another aspect of the present invention, there is provided a document processing method comprising: selecting a template which defines layout information of content; generating a document by laying out the content at a layout location indicated by the layout information defined in the template based on the template and the content; changing the layout information about the content contained in the generated document based on a user action; and storing the content, the layout information, and frequency information in a storage device as layout learning data by associating the content, the layout information, and the frequency information with each other when the layout information is changed, where the frequency information represents frequency with which the content has been applied or changed.

Further features of the present invention will become apparent from the following description of exemplary embodiments with reference to the attached drawings.

BRIEF DESCRIPTION OF THE DRAWINGS

FIG. 5 is a diagram showing an exemplary configuration of a document component data storage unit 108 shown in FIG. 1;

FIGS. 16A and 16B are diagrams showing examples of document templates;

FIG. 17 is a diagram showing an example of layout learning data;

DESCRIPTION OF THE EMBODIMENTS

Embodiments of the present invention will be described in detail below with reference to the drawings.

First Embodiment

Figure 1:
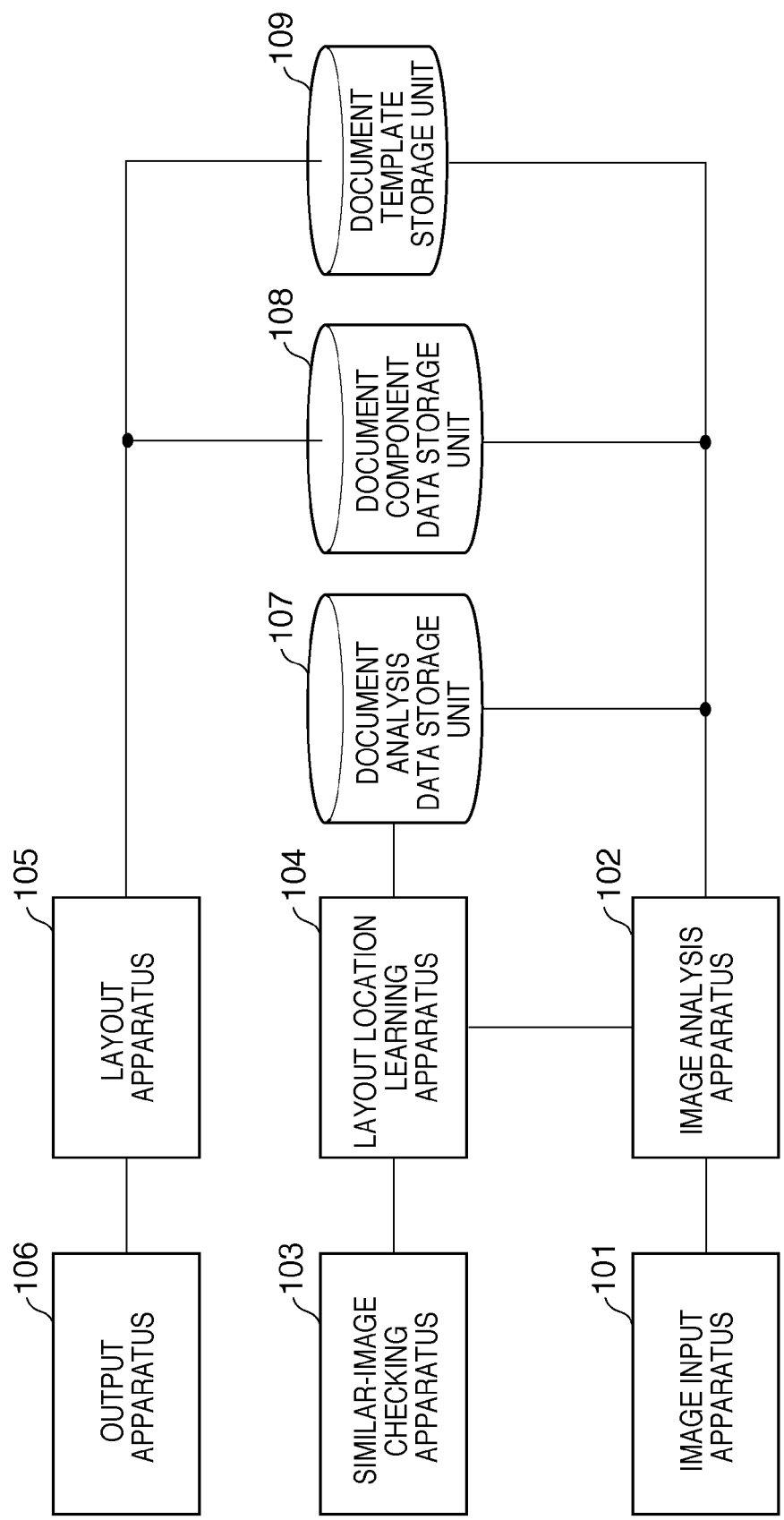
FIG. 1 is a diagram showing an exemplary configuration of a document processing apparatus according to a first embodiment.

FIG. 1 is a diagram showing an exemplary configuration of a document processing apparatus according to a first embodiment. An image input apparatus 101 converts a document image scanned by a surface scanner or image captured by a digital camera into digital data. Alternatively, the image input apparatus 101 may be an apparatus which accepts input of PDL data transmitted from a printer driver. Furthermore, the image input apparatus 101 may be an apparatus which reads digital image data out of a storage. Incidentally, according to the first embodiment, it is assumed that the image input apparatus 101 accepts input of document images or PDL images made up of images, characters, graphics, and the like.

An image analysis apparatus 102 analyzes image information inputted via the image input apparatus 101. Results of image analysis conducted by the image analysis apparatus 102 are stored as analyzed image information in a document analysis data storage unit 107. A similar-image checking apparatus 103 determines whether or not a document component data storage unit 108 contains an image which has a visual feature similar to the analyzed image information. A layout location learning apparatus 104 retrieves the analyzed image information from the document analysis data storage unit 107, associates, on an input image, the analyzed image information with layout location information, and stores the associated information in the document component data storage unit 108.

A layout apparatus 105 lays out the image information stored in the document component data storage unit 108 based on a document template stored in a document template storage unit 109. An output apparatus 106 is a printer or display which visually presents the images laid out by the layout apparatus 105.

Figure 2:
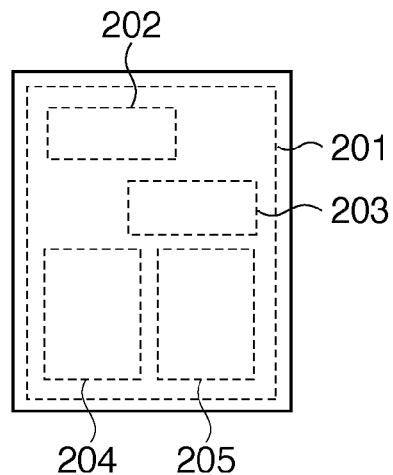
FIG. 2 is a diagram showing a brief example of analysis results produced by an image analysis apparatus 102 shown in FIG. 1.

FIG. 2 is a diagram showing a brief example of analysis results produced by the image analysis apparatus 102 shown in FIG. 1. The image analysis apparatus 102 analyzes pixel blocks of input image information according to features of regions and separates regions such as a background region 201, image regions 202, 203, and 204, and a character region 205. A method for separating regions can be implemented using a known technique such as disclosed in Japanese Patent Laid-Open No. 2000-293671. The background region 201 is separated, being distinguished from the other regions.

Figure 3:
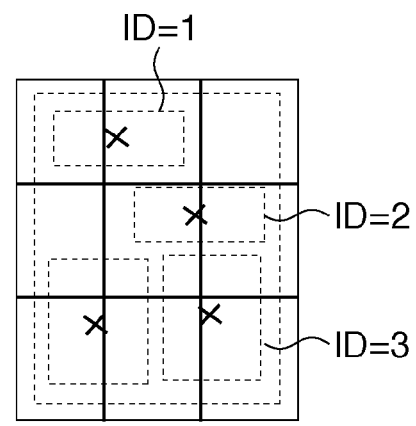
FIG. 3 is a diagram showing an example of extracted regions to be processed by a layout location learning apparatus 104 shown in FIG. 1.

FIG. 3 is a diagram showing an example of extracted regions to be processed by the layout location learning apparatus 104 shown in FIG. 1. In this example, three image regions with IDs of 1 to 3 are extracted as regions whose layout locations are to be learned. The entire image is divided into nine parts by auxiliary grid lines which identify layout locations. A symbol "X" represents a center-of-gravity position of each of the regions analyzed in FIG. 2.

Figure 4:
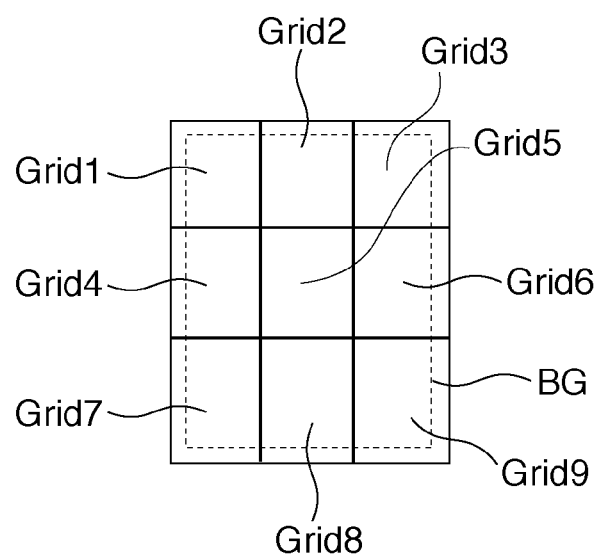
FIG. 4 is a diagram showing an example of layout location information about document components according to the first embodiment.

FIG. 4 is a diagram showing an example of layout location information about document components according to the first embodiment. Layout location label names Grid 1 to Grid 9 are assigned to the regions divided by the auxiliary grid lines in FIG. 3. A label name BG is assigned to the background region behind the grids.

FIG. 5 is a diagram showing an exemplary configuration of the document component data storage unit 108 shown in FIG. 1. Column 501 contains unique numbers used to identify individual items of document component data. Column 502 contains file path information about image component data saved in files. Column 503 contains size of the image component data in terms of pixel counts in height and width directions. Columns 504 to 512 respectively contain frequencies with which the center-of-gravity position of the image component data is placed in Grid 1 to Grid 9 shown in FIG. 4.

Column 513 contains a frequency with which the image data is placed in the background region labeled BG shown in FIG. 4. Columns 514 to 517 contain frequency counts of aspect ratio shapes of documents in which the image component data has been used. Columns 514, 515, 516, and 517 respectively contain frequency counts of portrait shapes whose vertical dimension is larger than the horizontal dimension, landscape shapes whose horizontal dimension is larger than the vertical dimension, square shapes whose vertical dimension is equal to the horizontal dimension, and other shapes.

Figure 6:
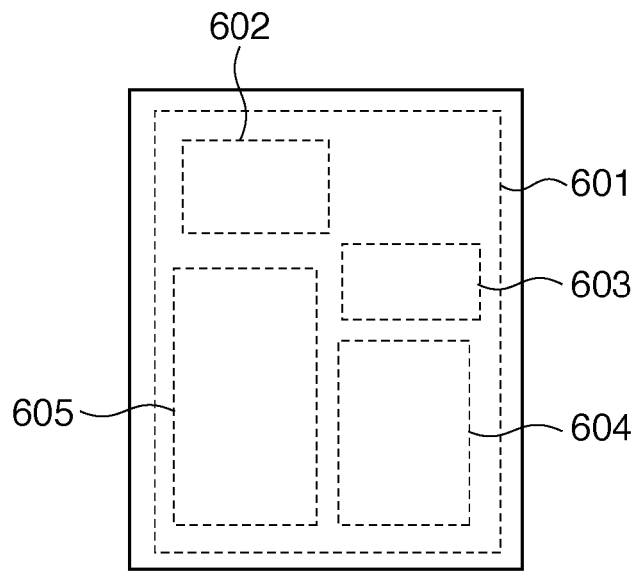
FIG. 6 is a diagram showing an example of a document template stored in a document template storage unit 109 shown in FIG. 1.

FIG. 6 is a diagram showing an example of a document template stored in the document template storage unit 109 shown in FIG. 1. Incidentally, the document template specifies layout locations of content (images, characters, graphics) which provide components of a document.

In this example, reference numeral 601 denotes a background region in which content serving as a background component is laid out, 602 to 604 denote image regions in which image components are laid out, and 605 denotes a character region in which characters are laid out.

Description will be given of the process of analyzing input image information, learning layout locations, and outputting an optimal layout using the above configuration.

Figure 7:
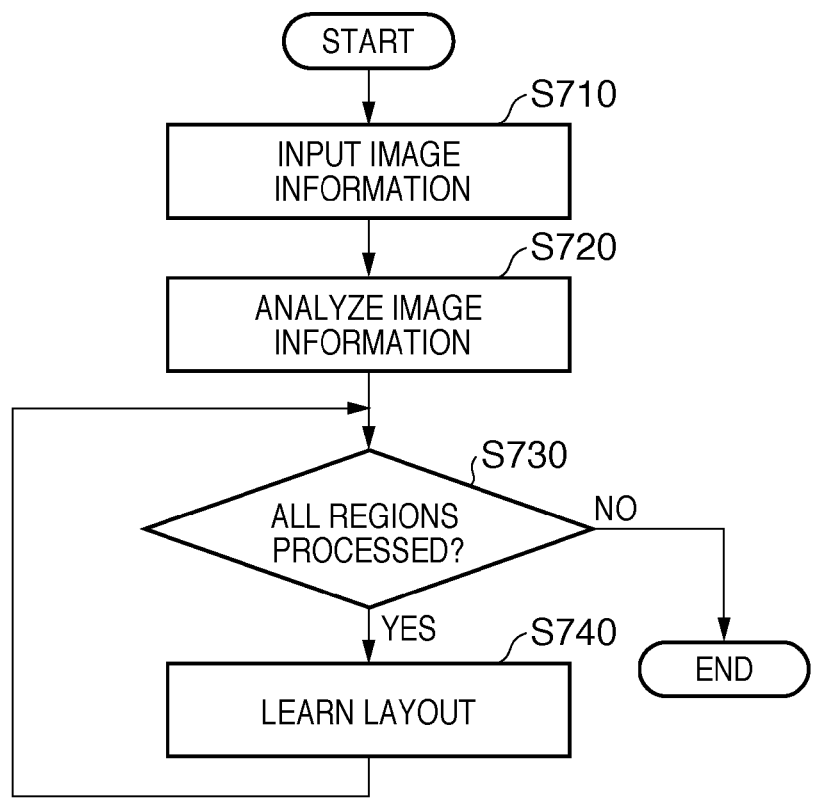
FIG. 7 is a flowchart showing a process beginning with image input, according to the first embodiment.

FIG. 7 is a flowchart showing a process beginning with image input, according to the first embodiment. First, in Step S710, image information is inputted via the image input apparatus 101. Next, in Step S720, the input image information is transmitted to the image analysis apparatus 102, which separates regions in the image information according to type. The regions are separated using a method such as disclosed in Japanese Patent Laid-Open No. 2000-293671. After the regions are separated, the image information is stored in the document analysis data storage unit 107.

In Step S730, it is determined whether or not all the analyzed regions have been processed, that is, whether or not all layout locations of image data constituting document components have been learned. When it is determined that the layout locations have been learned in all the regions, the processing is finished. If there is any region yet to be processed, the layout location learning apparatus 104 learns the layout location of document component data in Step S740 and returns to the determination process in Step S730.

Figure 8:
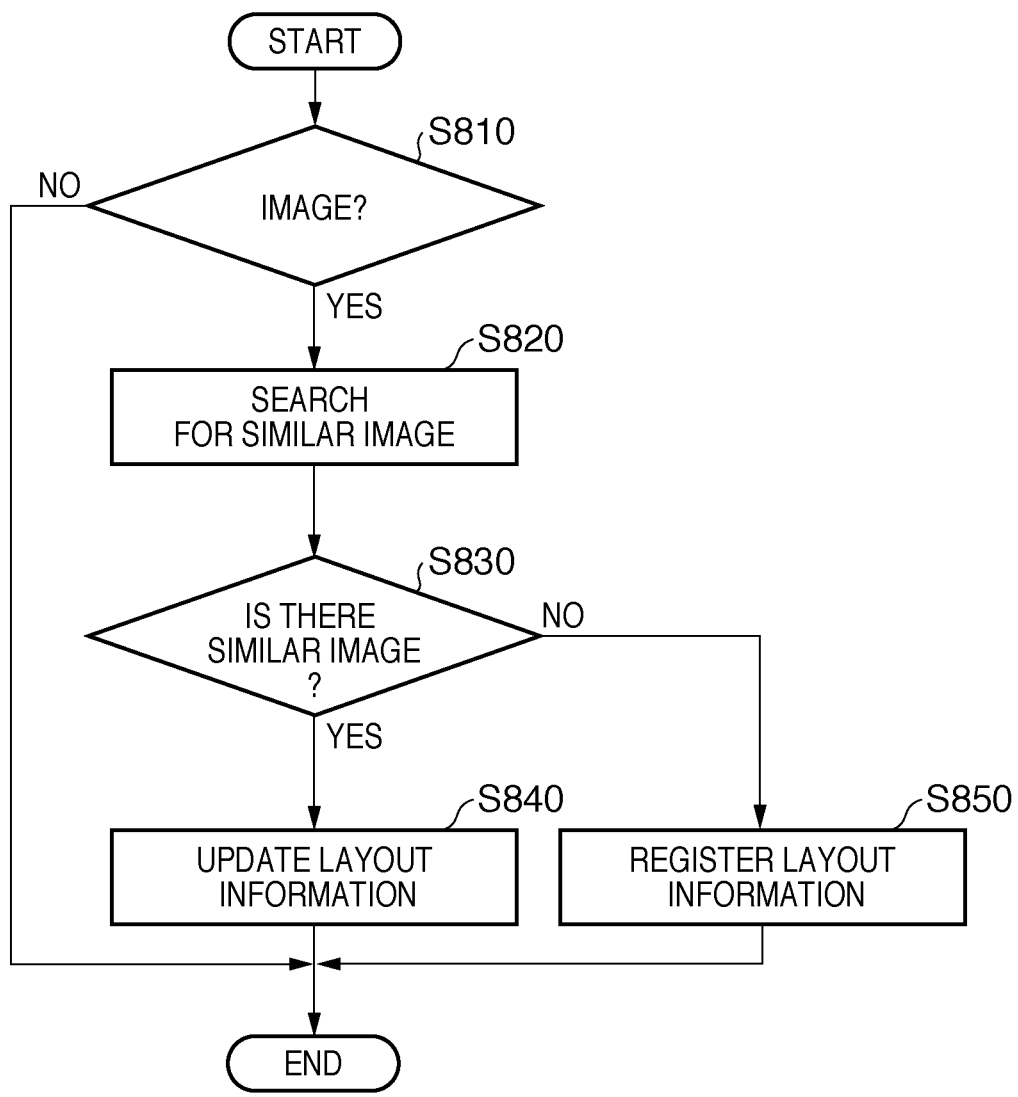
FIG. 8 is a flowchart showing a layout location learning process according to the first embodiment.

FIG. 8 is a flowchart showing a layout location learning process according to the first embodiment. This process corresponds to Step S740 shown in FIG. 7 in which the layout location learning apparatus 104 learns the layout location of document component data.

First, in Step S810, it is determined whether or not the region to be processed is an image region. If the given region is not an image region, layout learning of the document component data in the given region is finished. If the given region is an image region, the flow goes to Step S820 where the similar-image checking apparatus 103 determines whether or not the document component data storage unit 108 contains a similar image which has a visual feature similar to the image in the given region. The similar-image checking process can be implemented by a known technique which separates image information into multiple regions, extracts a dominant representative color from each region, and measures the agreement of color distribution trends.

If it is determined in the similar-image checking process in Step S830 that there is a similar image, the flow goes to Step S840 where layout information about the image data stored in the document component data storage unit 108 is updated. Specifically, center-of-gravity coordinates of the given region are determined, grid position in which the center of gravity is located is determined, and frequency count of the grid position in the document component data storage unit 108 is incremented by one. In the case of a background region, frequency count of the background BG is incremented. Also, it is determined whether or not the input document image has a portrait, landscape, horizontal, or other shape, and frequency count of the appropriate shape is incremented by one.

On the other hand, if it is determined in Step S830 that there is no similar image, the flow goes to Step S850 where the input image is registered as new document component data in the document component data storage unit 108. Specifically, a new image ID number is issued, the image data is stored, and the file path of the image data is stored in the document component data storage unit 108. Then, layout location information is learned as in the case of Step S840.

Figure 9:
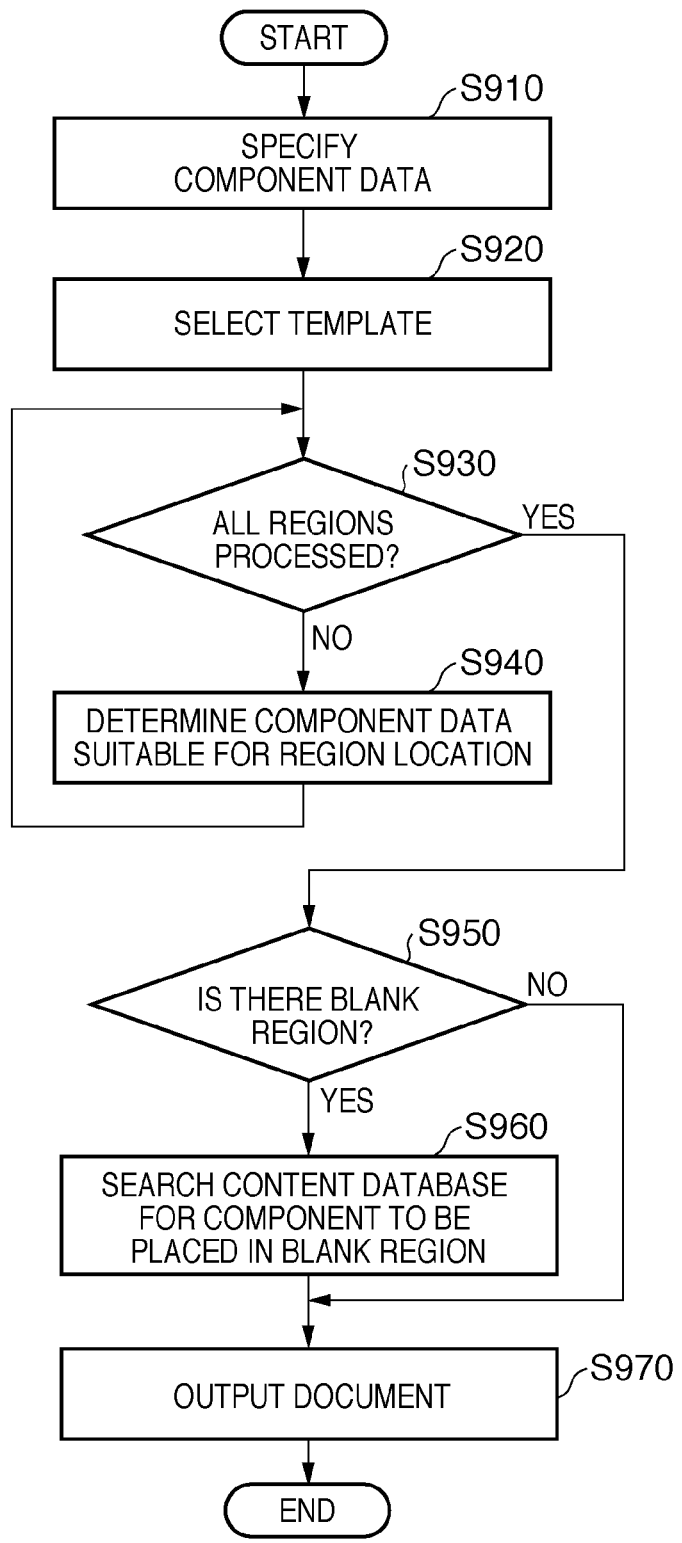
FIG. 9 is a flowchart showing a document layout process according to the first embodiment.

Next, a document layout process performed by the layout apparatus 105 will be described with reference to FIG. 9. FIG. 9 is a flowchart showing the document layout process according to the first embodiment. First, in Step S910, the layout apparatus 105 specifies one or more items of component data of the document. Then, in Step S920, the layout apparatus 105 selects one of the document templates stored in the document template storage unit 109. The process of selecting a document template will be described in detail later with reference to FIG. 10.

Next, in Step S930, the layout apparatus 105 determines whether or not component data has been placed in all component data storage regions of the template. If it is determined that component data has not been placed in all the component data storage regions, the layout apparatus 105 goes to Step S940 to determine image component data which is suitable for a region location. Then, the layout apparatus 105 returns to Step S930 to repeat a suitable-component layout process until all the regions are filled. The suitable-component layout process in Step S940 will be further described in detail later with reference to FIG. 11.

When it is determined in Step S930 that component data layout in all the regions has been finished, the layout apparatus 105 goes to Step S950 to determine whether or not there is any blank region without any component data. If there is a blank region, the layout apparatus 105 goes to Step S960. In Step S960, the layout apparatus 105 searches the document component data storage unit 108 for image component data which has been placed with the highest frequency in the grid region corresponding to the center-of-gravity position of the blank region and determines the document component data as a component to be placed in the blank region. In Step S970, based on layout information of the template, the layout apparatus 105 lays out the component data whose layout locations have been established, and thereby produces a document ready to be output to the output apparatus 106.

Figure 10:
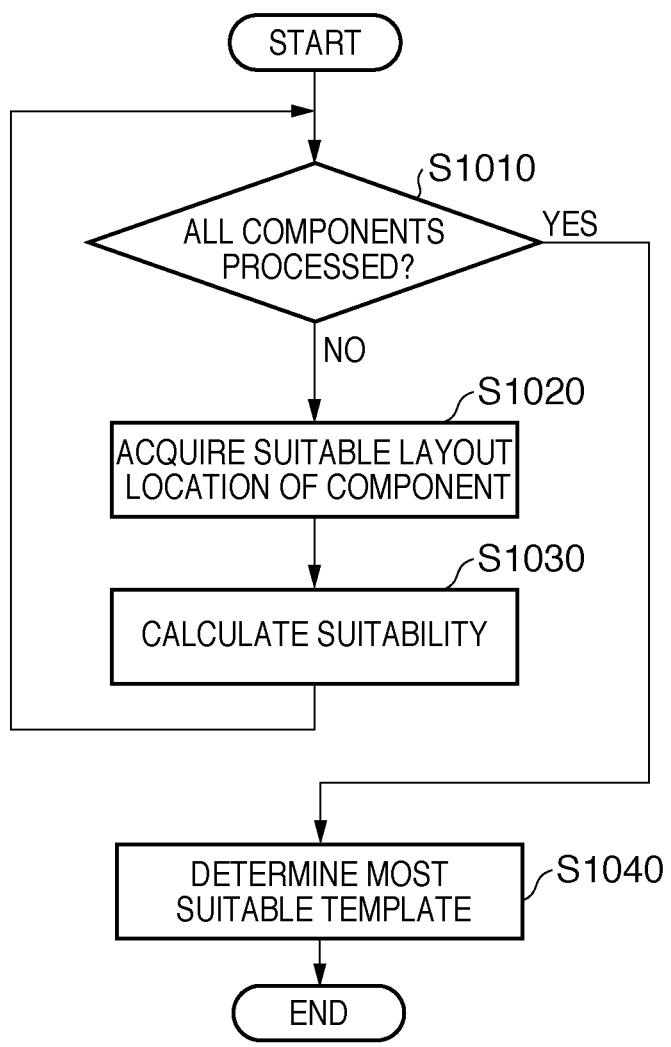
FIG. 10 is a flowchart showing details of a template selection process according to the first embodiment.

Next, the process of selecting a template suitable for specified image component data will be described in detail. FIG. 10 is a flowchart showing details of a template selection process according to the first embodiment. First, in Step S1010, it is determined whether or not all the specified image component data has been processed. If it is determined that there is any component data yet to be processed, the flow goes to Step S1020 to determine a suitable layout location of the component data with reference to the document component data storage unit 108. A score of 100 is assigned to a template containing an image region which can be placed in the same grid as the grid in which the component data has been placed with the highest frequency. A score of 90 is assigned to a template containing an image region which can be placed in the same grid as the grid in which the component data has been placed with the second highest frequency. In this way, scores are assigned down to the template rated fifth.

However, once a template is assigned a high score, the template will never be evaluated for another region in relation to a lower score.

When searches for suitable templates are finished in relation to all component data, the template with the highest score is established as the most suitable template in Step S1040.

Figure 11:
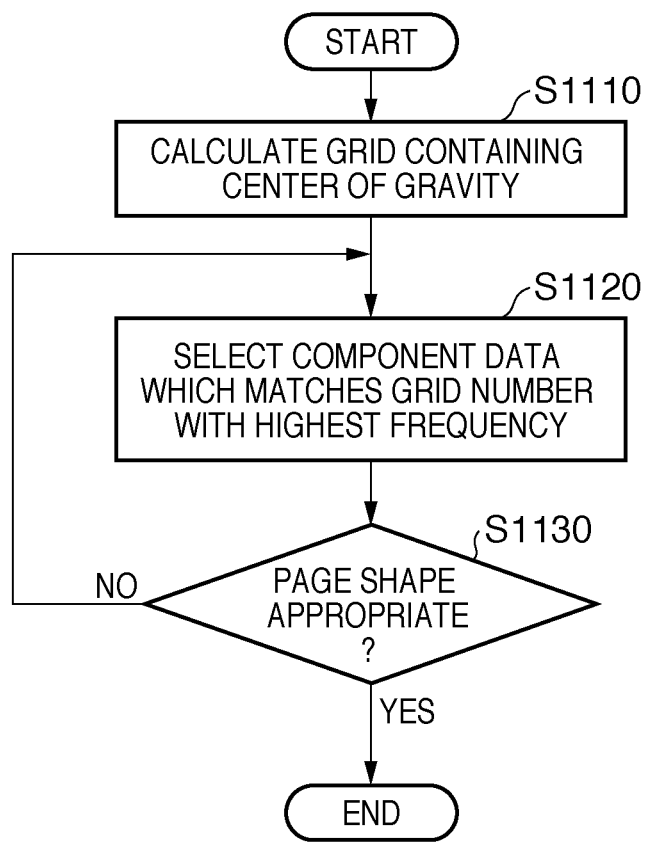
FIG. 11 is a flowchart showing details of a suitable-component layout process according to the first embodiment.

FIG. 11 is a flowchart showing details of a suitable-component layout process according to the first embodiment. First, in Step S1110, a grid position in which the center of gravity is located is determined. Next, in Step S1120, the component data which matches the grid position with the highest frequency is selected from the document component data storage unit 108. In Step S1130, it is determined whether or not the frequency with which the selected component data matches document shape of the template selected in Step S920 is higher than zero, that is, whether or not the selected component data has ever been used in a document with the given document shape. If the component data matches the document shape, the component data is determined to be component data to be placed in the region, and the suitable-component layout process is finished. If the component data does not match the document shape, the flow returns to Step S1120 to search for a next candidate for component data to be placed in the region.

The first embodiment makes it possible to automatically determine a suitable layout of images as components using a layout pattern actually used in the past, without the need for an operator to specify layout locations of individual images.

Second Embodiment

Next, a second embodiment of the present invention will be described with reference to the drawings.

Figure 12:
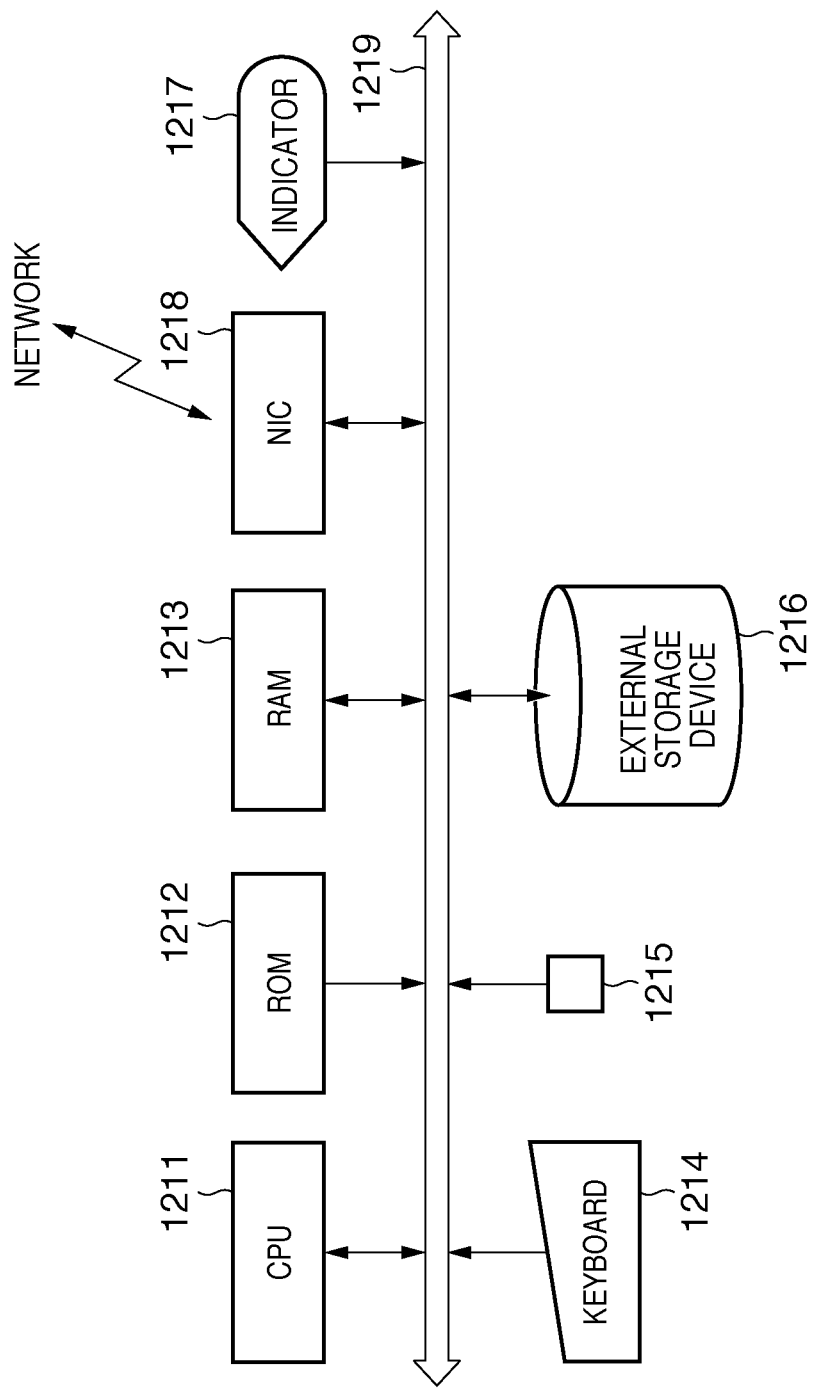
FIG. 12 is a diagram showing an exemplary hardware configuration of an information processing apparatus (computer)

FIG. 12 is a diagram showing an exemplary hardware configuration of an information processing apparatus (computer). In FIG. 12, a CPU 1211 performs various control of the information processing apparatus according to a program described later. A ROM 1212 stores a boot program executed at the start of the information processing apparatus as well as various data. A RAM 1213 stores a control program executed by the CPU 1211 and provides a work area in order for the CPU 1211 to perform various controls. A keyboard 1214 and mouse 1215 provide an input environment to the user.

An external storage device 1216 is a hard disk, optical disk, magnetic disk, magneto-optical disk, magnetic tape, or the like. However, the external storage device 1216 is not strictly necessary if the control program and various data are all stored on the ROM 1212. An indicator 1217, which is a display or the like, displays processing results and the like to the user. A network interface (NIC) 1218 enables communications with other apparatus on a network via a LAN cable or the like. A bus 1219 interconnects the above components.

When the CPU 1211 performs processing based on the program stored on the ROM 1212 or external storage device 1216, functions of the information processing apparatus and/or processes of flowcharts described later are implemented.

Figure 13:
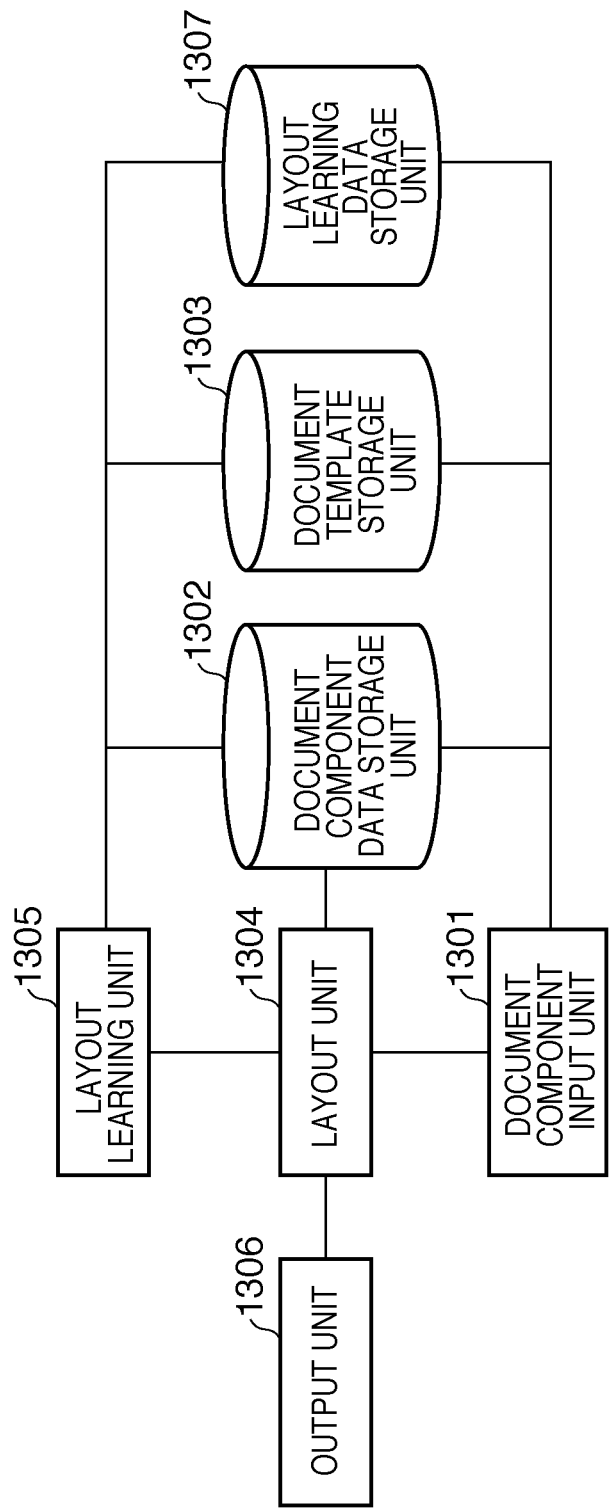
FIG. 13 is a diagram showing an exemplary functional configuration of the information processing apparatus.

FIG. 13 is a diagram showing an exemplary functional configuration of the information processing apparatus. A document component input unit 1301 specifies images and text information stored in a document component data storage unit 1302 to a layout unit 1304 as document components, where the images and text information are examples of content. A document template storage unit 1303 stores document template layout information (hereinafter referred to as a document template) which describes a page layout. The layout unit 1304 lays out the document data specified via the document component input unit 1301, with reference to a document template stored in the document template storage unit 1303. Also, the layout unit 1304 edits results of the layout based on user actions and generates document data which can be output to an output unit 1306. After the layout unit 1304 does layout editing, a layout learning unit 1305 stores results of the editing as learning data in a layout learning data storage unit 1307.

Figure 14A:
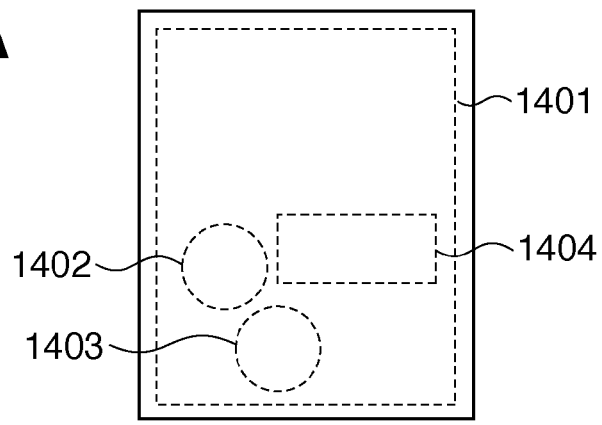
FIGS. 14A to 14C are diagrams showing examples of document templates.
Figure 14B:
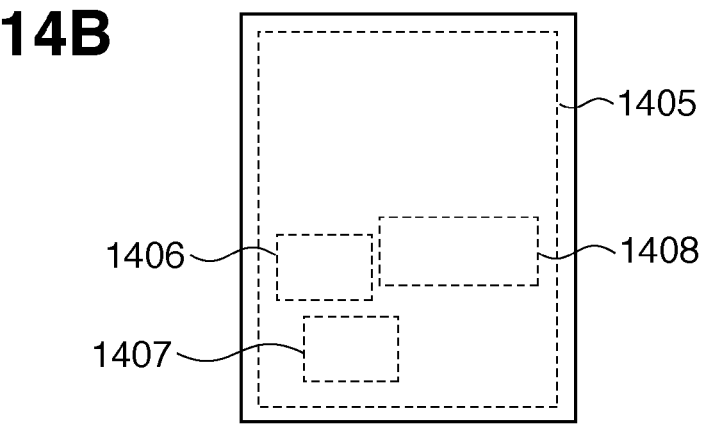
Figure 14C:
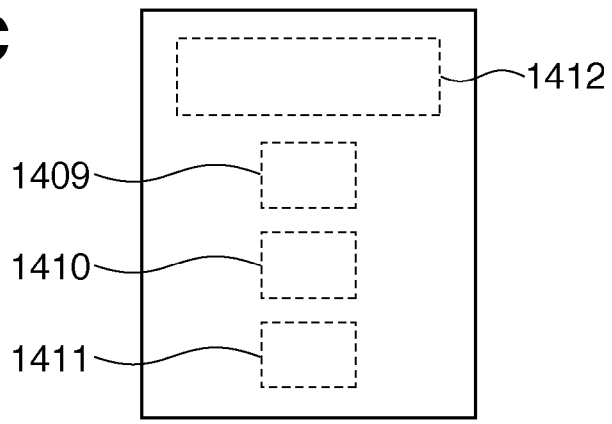

FIGS. 14A to 14C are diagrams showing examples of document templates. FIG. 14A shows a template which includes a background photo frame 1401, two photo frames 1402 and 1403, and a text frame 1404. FIG. 14B shows an example of another template belonging to the same template group as the template in FIG. 14A. As in the case of the template in FIG. 14A, the template in FIG. 14B includes a background photo frame 1405, two photo frames 1406 and 1407, and a text frame 1408, which are placed at the same locations as in FIG. 14A. However, the photo frames 1406 and 1407 differ in shape from those in FIG. 14A.

FIG. 14C shows an example of another template belonging to a template group different from the template group in FIGS. 14A and 14B. The template in FIG. 14C includes three photo frames 1409, 1410, and 1411 and a text frame 1412, which are laid out in a manner different from the frames in FIGS. 14A and 14B.

Figure 15A:
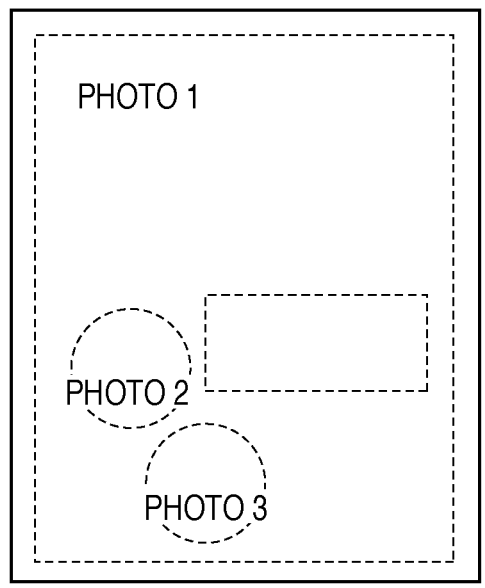
FIGS. 15A and 15B are diagrams showing examples of layout editing.
Figure 15B:
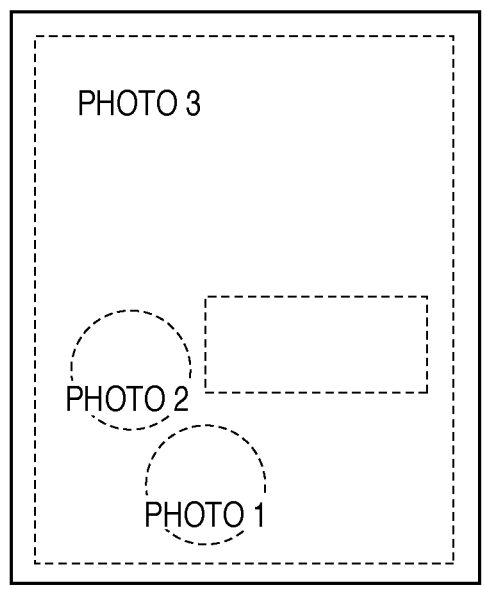

FIGS. 15A and 15B are diagrams showing examples of layout editing. FIG. 15A shows a layout before layout editing. In FIG. 15A, photo 1, photo 2, and photo 3 input as document components are applied to the template in FIG. 14A, resulting in the photo frames 1401, 1402, and 1403 in FIG. 14A.

FIG. 15B shows layout results produced by the layout editing of the frames in FIG. 15A. In FIG. 15B, photo 1 and photo 3 are replaced with each other when compared to FIG. 15A. Consequently, photo 1 has been changed from photo frame 1401 to photo frame 1403 while photo 3 has been changed from photo frame 1403 to photo frame 1401.

FIGS. 16A and 16B are diagrams showing examples of document templates. In FIG. 16A, a  element defines a page layout of a document template and has four attributes as follows. A templateID attribute is a unique identifier which uniquely identifies a template definition. A group attribute contains a group identifier of the group to which the template belongs. A size attribute specifies page size. An orientation attribute specifies a page layout direction.

A <bg> element, which is an example of frame information, is a layout element which defines a layout of a background image in the document template. The <bg> element has six attributes as follows. An x attribute and y attribute define coordinate values at which the layout element is placed in a coordinate system in which the upper left corner of the page is set at 0, with the x and y attributes increasing rightward and downward, respectively. A slotID attribute is a unique identifier which uniquely identifies the layout element. A type attribute represents the type of a document component placed on the layout element. An orientation attribute represents a recommended photo layout direction when the type attribute is photo. A crop attribute represents the use or non-use of trimming to the shape of a layout frame when a photo is placed on the layout element.

A <slot> element, which is an example of frame information, describes layout region allocation information used to lay out document components. The <slot> element has a font attribute, size attribute, and direction attribute which are set when the type attribute is text, in addition to the same six attributes as the <bg> element. The font attribute specifies the font type of text and the size attribute contains character size in points pt. The direction attribute specifies a layout direction of the text. Incidentally, the attributes of the elements described above may be omitted.

Correspondence among layout elements in document templates belonging to the same template group is defined in FIG. 16B. A <slotRelation> element, which includes an arbitrary number of <group> elements, defines correspondence among layout elements. Each <group> element, which includes an arbitrary number of <slots> elements, provides group identifier information serving as an id attribute. Each <slots> element, which has a unified identifier of multiple corresponding layout elements as a unifiedID attribute, specifies the corresponding layout elements. For example, in FIG. 16B, "123000" and "154000" out of layout template frame information corresponds to each other and are equivalent in layout intention in template definition, where the layout template frame information is included in the templates belonging to a template group "g001."

FIG. 17 is a diagram showing an example of layout learning data. A <slotSelection> element, which includes an arbitrary number of <set> elements, defines layout learning data. Each <set> element represents an individual item of layout learning data and has a contentID attribute which specifies an identifier of document component data whose layout is to be learned and an update attribute which specifies the time at which a layout learning process was performed. The attribute values of the <set> elements can be omitted.

The <set> element includes an arbitrary number of <slot> elements which specify layout information on the template to be learned. Each <slot> element includes an <id> element and <freq> element. The <id> element stores a slotID value in the <slot> element in FIG. 16B, that is, frame information on the template to be learned, or a unifiedID value which is the unified identifier of template group information. The <freq> element provides frequency information about the frequency with which the document component represented by the contentID attribute of the <set> element—which is a superior element—has been applied to frame information or has been changed in application. A greater positive value means higher applicability to frame information and a greater negative value means lower applicability to frame information.

By storing layout learning data as well-formed XML data in a storage unit widely known as an XML database, the information processing apparatus makes it possible to search only for necessary data quickly and easily using an element or attribute value as a search key.

Figure 18:
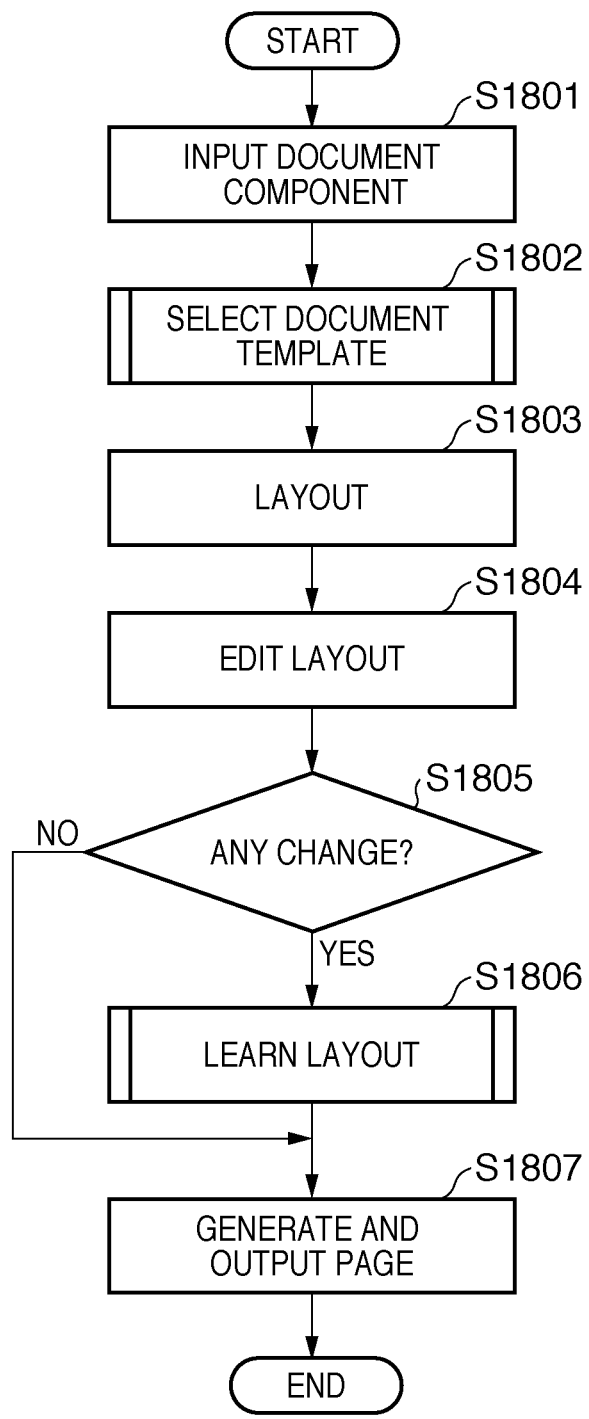
FIG. 18 is a flowchart showing an example of a document generation process.

FIG. 18 is a flowchart showing an example of a document generation process. First, in Step S1801, the document component input unit 1301 accepts input of images and character information which provide components of a document. To input the document components, the user specifies component data stored in the document component data storage unit 1302.

Next, in Step S1802, the document component input unit 1301 selects a document template. Details of the process in Step S1802 will be described later with reference FIG. 19. Once a template is selected in Step S1802, the document component data and document template are sent to the layout unit 1304 for a layout process in Step S1803. The layout unit 1304 lays out a page by fitting document component data in appropriate frames represented by the frame information of the selected template. If multiple templates are selected in Step S1802, the layout unit 1304 lays out multiple pages in Step S1803.

Next, in Step S1804, based on a user action, the layout unit 1304 replaces photo frames with each other, for example, as shown in FIG. 15B, in layout results produced in Step S1803.

In Step S1805, the layout unit 1304 determines whether or not layout editing has been performed in Step S1804. If there has been no change, the flow goes to Step S1807. If there has been any change, the flow goes to Step S1806.

In Step S1806, the layout learning unit 1305 stores the changes as layout learning data by associating content (content ID), frame information (which is an example of layout information), and frequency information with each other. Details of the process in Step S1806 will be described later with reference FIG. 20. In Step S1807, the layout unit 1304 definitely establishes the layout results, generates page data, sends the page data to the output unit 1306, and thereby finishes the document generation process.

Figure 19:
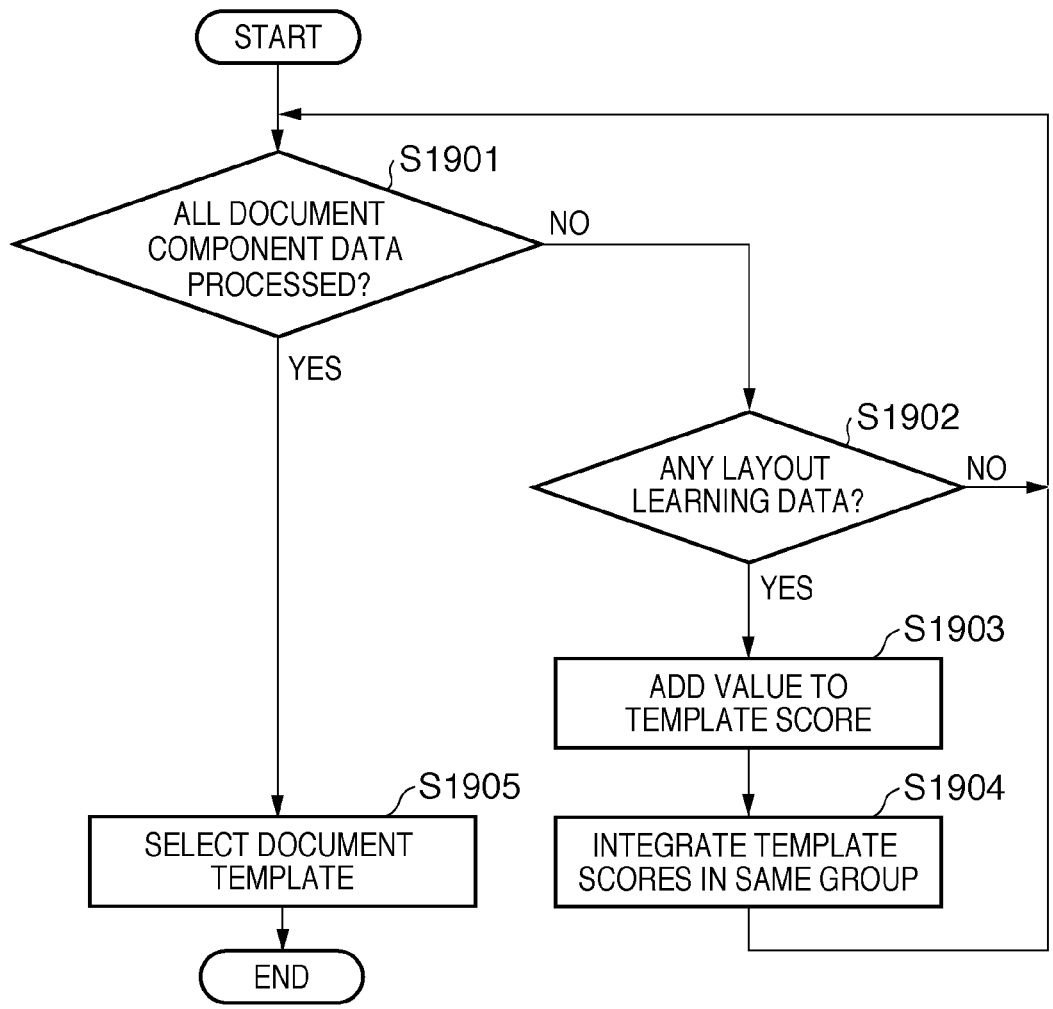
FIG. 19 is a flowchart showing an example of a document template selection process.

FIG. 19 is a flowchart showing an example of a document template selection process. In Step S1901, the document component input unit 1301 determines whether or not all inputted document component data has been processed. If there is any document component data yet to be processed, the document component input unit 1301 goes to Step S1902. Otherwise, the document component input unit 1301 goes to Step S1905.

In Step S1902, the document component input unit 1301 determines whether or not there is any layout learning data for the document component data to be processed. The document component input unit 1301 searches the layout learning data storage unit 1307 using the identifier of the document component data as a key. If the document component data matches the contentID attribute of the <set> element (such as described in FIG. 17) of any layout learning data, the document component input unit 1301 goes to Step S1903. Otherwise, the document component input unit 1301 goes to Step S1901.

In Step S1903, the document component input unit 1301 acquires <slot> element data, where the <slot> element is a subordinate element of the <set> element. Using the value of the acquired <id> element as a key, from the document template storage unit 1303, the document component input unit 1301 acquires the template identifier templateID of a document template containing frame information and adds the value of the <freq> element data to a template score (not shown).

In Step S1904, if the <id> element value is a template group identifier, the document component input unit 1301 searches for data which matches the id attribute of <group> element data, where the <group> element is a child element of the <slotRelation> element. After acquiring the identifier of the frame information represented by the <slot> element, the document component input unit 1301 similarly acquires the template identifier of the template containing appropriate frame information, similarly integrates template scores, and then goes to Step S1901. When all the input document component data has been processed, in Step S1905, the document component input unit 1301 selects the document template with the highest integrated template score as the template to be applied. If there are two or more templates with the highest template score, the document component input unit 1301 selects (holds) the templates as candidates.

Figure 20:
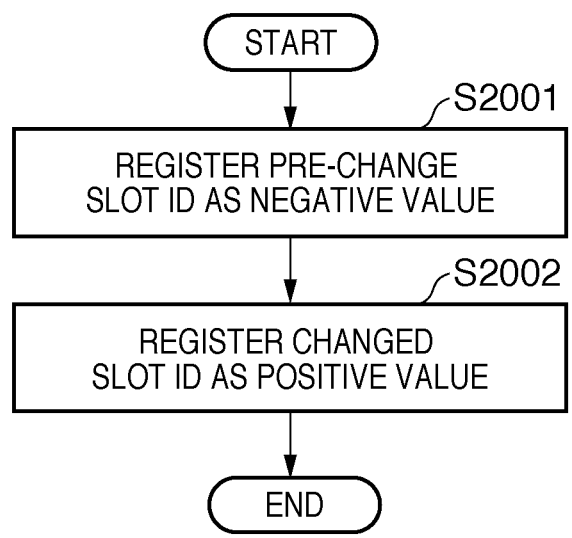
FIG. 20 is a flowchart showing an example of a layout learning process.

FIG. 20 is a flowchart showing an example of a layout learning process. In Step S2001, the layout learning unit 1305 stores (registers) the pre-edition (pre-change) frame information as negative values in relation to document components including the document components fitted in the frame information before the layout editing and all the changed document components after the layout editing. To store the learning data, the layout learning unit 1305 searches template information using a frame information ID as a key and stores a unified frame information identifier of an appropriate template group, if found, as learning data.

Next, in Step S2002, the layout learning unit 1305 stores (registers) the post-edition (post-change) frame information as positive values in relation to the document components including the document components fitted in the frame information before the layout editing and all the changed document components after the layout editing. As in the case of Step S2001, the layout learning unit 1305 stores an appropriate unified frame information identifier, if found, as learning data.

Incidentally, although in the second embodiment, it is assumed that the document generation process is performed for a single user, layout may be learned for each of multiple users. Furthermore, layout learning data may be shared among different users. Also, although in the second embodiment, only changes made as a result of layout editing are stored as learning data, even if there is no change, information about satisfactory layout results may be added to layout learning data.

Thus, using a layout pattern actually used in the past, the second embodiment makes it possible to output a desirable layout of component data and automatically generate a suitable layout in proportion to its use. That is, the second embodiment makes it possible to output a desirable layout of content without the need for an operator to specify layout locations.

Needless to say, the objects of the present invention can also be achieved by a recording medium containing program code of software that implements the functions of the above embodiments: the program code is supplied to a system or apparatus, whose computer (or CPU or MPU) then reads the program code out of the storage medium and executes it.

In that case, the program code itself read out of the computer-readable recording medium will implement the functions of the above embodiments, and the recording medium which stores the program code will constitute the present invention.

Examples of the recording medium used to supply the program code include, for example, a flexible disk, hard disk, optical disk, magneto-optical disk, CD-ROM, CD-R, magnetic tape, non-volatile memory card, and ROM.

Also, the functions of the above embodiment can be implemented not only by the program code read out and executed by the computer, but also by part or all of the actual processing executed according to instructions from the program code by an OS (operating system) running on the computer.

Furthermore, the functions of the above embodiment can also be implemented by part or all of the actual processing executed by a CPU or the like contained in a function expansion card inserted in the computer or a function expansion unit connected to the computer if the processing is performed according to instructions from the program code that has been read out of the recording medium and written into memory on the function expansion card or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-098747, filed Apr. 4, 2008, and 2008-255256, field Sep. 30, 2008, which are hereby incorporated by reference herein in their entirety.

What is claimed is:

1. A document processing apparatus comprising:
an input unit that inputs image information from a plurality of documents;
a separation unit that separates content included in the plurality of documents from the image information;
a holding unit that (i) learns relation of a layout location in which the content has been laid out to the content separated by the separation unit and frequency of the layout location, and (ii) holds the learning as learning information;
an indication unit that indicates one or more items of content in a target document; and
a layout unit that lays out the one or more items of content indicated by the indication unit to a template for the target document, wherein the template is selected based on the held learning information,
wherein the holding unit comprises a non-transitory computer-readable storage medium.

2. The document processing apparatus according to claim 1, further comprising an output unit that outputs a document in which the one or more items of content is laid out.

3. The document processing apparatus according to claim 1, wherein said separation unit separates a background of the content by distinguishing the background from the image information serving as content.

4. The document processing apparatus according to claim 1, wherein the held information concerns an aspect ratio shape and location of the separated content.

5. The document processing apparatus according to claim 4, wherein said holding unit learns the information about the aspect ratio shape and location of the separated content as information used to lay out the separated content of the inputted document.

6. The document processing apparatus according to claim 1, wherein the holding unit comprises a determination unit that determines whether or not a similar image has already been stored, and updates the layout location corresponding to the similar image stored already to hold learning information of the updated layout location for the content included in the plurality of documents from the image information.

7. A document processing method comprising the steps of:
accepting, using an input unit, an input of image information from a plurality of documents;
separating, using a separation unit, content included in the plurality of documents from the image information;
learning, using a learning unit, a relation of a layout location in which the content has been laid out to the content separated in the separating step and frequency of the layout location;
holding, using a holding unit, results of the learning step as learning information;
indicating, an indication unit, one or more items of content in a target document; and
automatically laying out, using a layout unit, the one or more items of content indicated in the indicating step to a template for the target document, wherein the template is selected based on the held learning information.

8. A non-transitory computer-readable storage device storing a computer program for causing a computer to execute a document processing method, the method comprising:
accepting, using an input unit, input of image information from a plurality of documents;
separating, using a separation unit, content included in the plurality of documents from the image information;
learning, using a learning unit, a relation of a layout location in which the content has been laid out to the content separated in the separating step and frequency of the layout location;
holding, using a holding unit, results of the learning step as learning information;
indicating using an indication unit, one or more items of content in a target document; and
automatically laying out, using a layout unit, the one or more items of content indicated in the indicating step to a template for the target document, wherein the template is selected based on the held learning information.

9. A document processing apparatus comprising:
an input unit that inputs image information from a plurality of documents;
a separation unit that separates content included in the plurality of documents from the image information;
a holding unit that (i) learns relation of a layout location in which the content has been laid out to the content separated by the separation unit and frequency of the layout location, and (ii) holds the learning as learning information;
an indication unit that indicates one or more items of content; and
a layout unit that lays out the one or more items of content indicated by the indication unit to a document based on the held learning information,
wherein the holding unit comprises a computer-readable storage medium.

10. A document processing method comprising:
an input step of inputting, using an input unit, image information from a plurality of documents;
a separation step of separating, using a separation unit, content included in the plurality of documents from the image information;
a holding step of (i) learning, using a learning unit, a relation of a layout location in which the content has been laid out to the content separated in the separation step and frequency of the layout location, and (ii) holding, using a holding unit, the learning as learning information;
an indication step of indicating, using an indication unit, one or more items of content; and a layout step of automatically laying out, using a layout unit, the one or more items of content indicated by the indication unit to a document based on the held learning information.

11. A non-transitory computer-readable storage device storing a computer program for causing a computer to execute a method, the method comprising:

an input step of inputting image, using an input unit, information from a plurality of documents;

a separation step of separating, using a separation unit, content included in the plurality of documents from the image information;

a holding step of (i) learning, using a learning unit, a relation of a layout location in which the content has been laid out to the content separated in the separation step and frequency of the layout location, and (ii) holding, using a holding unit, the learning as learning information;

an indication step of indicating, using an indication unit, one or more items of content; and a layout step of automatically laying out, using a layout unit, the one or more items of content indicated by the indication unit to a document based on the held learning information.

* * * * *